United States Patent
Ito et al.

(10) Patent No.: US 7,819,104 B2
(45) Date of Patent: Oct. 26, 2010

(54) INTAKE APPARATUS FOR INTERNAL COMBUSTION ENGINE

(75) Inventors: Atsushi Ito, Anjo (JP); Eiji Sakagami, Chiryu (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 103 days.

(21) Appl. No.: 12/373,875

(22) PCT Filed: Jul. 17, 2007

(86) PCT No.: PCT/JP2007/064396

§ 371 (c)(1),
(2), (4) Date: Jan. 14, 2009

(87) PCT Pub. No.: WO2008/010590

PCT Pub. Date: Jan. 24, 2008

(65) Prior Publication Data

US 2009/0283065 A1     Nov. 19, 2009

(30) Foreign Application Priority Data

Jul. 20, 2006   (JP) .............................. 2006-198359

(51) Int. Cl.
F02M 35/10     (2006.01)
(52) U.S. Cl. .............................. 123/184.55; 123/184.53
(58) Field of Classification Search ............ 123/184.53, 123/184.55
See application file for complete search history.

(56) References Cited

U.S. PATENT DOCUMENTS

| | | | |
|---|---|---|---|
| 6,138,628 A | 10/2000 | Alex et al. | |
| 6,588,389 B1 | 7/2003 | Jessberger et al. | |
| 2003/0213456 A1 | 11/2003 | Klotz et al. | |

FOREIGN PATENT DOCUMENTS

| | | |
|---|---|---|
| DE | 19944108 A1 | 3/2001 |
| EP | 1340892 A2 | 9/2003 |
| JP | 2001-519006 A | 10/2001 |
| JP | 2002-130063 A | 5/2002 |
| JP | 2002-130064 A | 5/2002 |
| JP | 2003-083072 A | 3/2003 |

OTHER PUBLICATIONS

International Search Report for PCT/JP2007/064396 completed on Oct. 10, 2007.
Written Opinion of the International Searching Authority completed Oct. 10, 2007.

*Primary Examiner*—Noah Kamen
(74) *Attorney, Agent, or Firm*—Buchanan Ingersoll & Rooney PC (57) ABSTRACT

An intake apparatus for an internal combustion engine comprises an intake manifold (1); a rotary valve (10) including a plurality of valve portions (11) in communication with air feeding passages (3) through feed switch openings (7); a sealing member (60) fitted to the valve portion, the sealing member including ring portions (61) and interconnecting portions interconnecting the ring portions, recessed portions (76) defined on an outer side of the valve portions for receiving engaging portions (64) on inner sides of the interconnecting portions of the sealing members, wherein a distance (D1$a$) from a central portion of an outer peripheral edge (20$a$) of the closed area portion (20) to the rotational axis (P) is set smaller than a distance (D2) from a second central portion (43) of an outer peripheral edge (40$a$) of the open area portion (40) to the rotational axis.

6 Claims, 10 Drawing Sheets

INTAKE APPARATUS FOR INTERNAL COMBUSTION ENGINE

TECHNICAL FIELD

The present invention is directed to an intake apparatus for an internal combustion engine.

BACKGROUND ART

An intake apparatus for an internal combustion engine is known from e.g. U.S. Pat. No. 6,138,628.

The intake apparatus for an internal combustion engine disclosed in this patent comprises an intake manifold and a camshaft controller disposed within this intake manifold.

The intake manifold forms a plurality of air feeding passages with individual induction tubes and shorter individual induction tubes for respectively feeding air to a plurality of cylinders of the internal combustion engine.

The camshaft controller includes a plurality of portions that have openings and that are rotatable together. Each portion is operable to open and close an individual induction tube associated therewith.

Each portion of the camshaft controller includes a sealing cage. This sealing cage includes a pair of ring elements and sealing bars connecting the pair of ring elements to each other. Each ring element is fitted within a groove located at a corresponding end of the valve portion.

Figure 14:
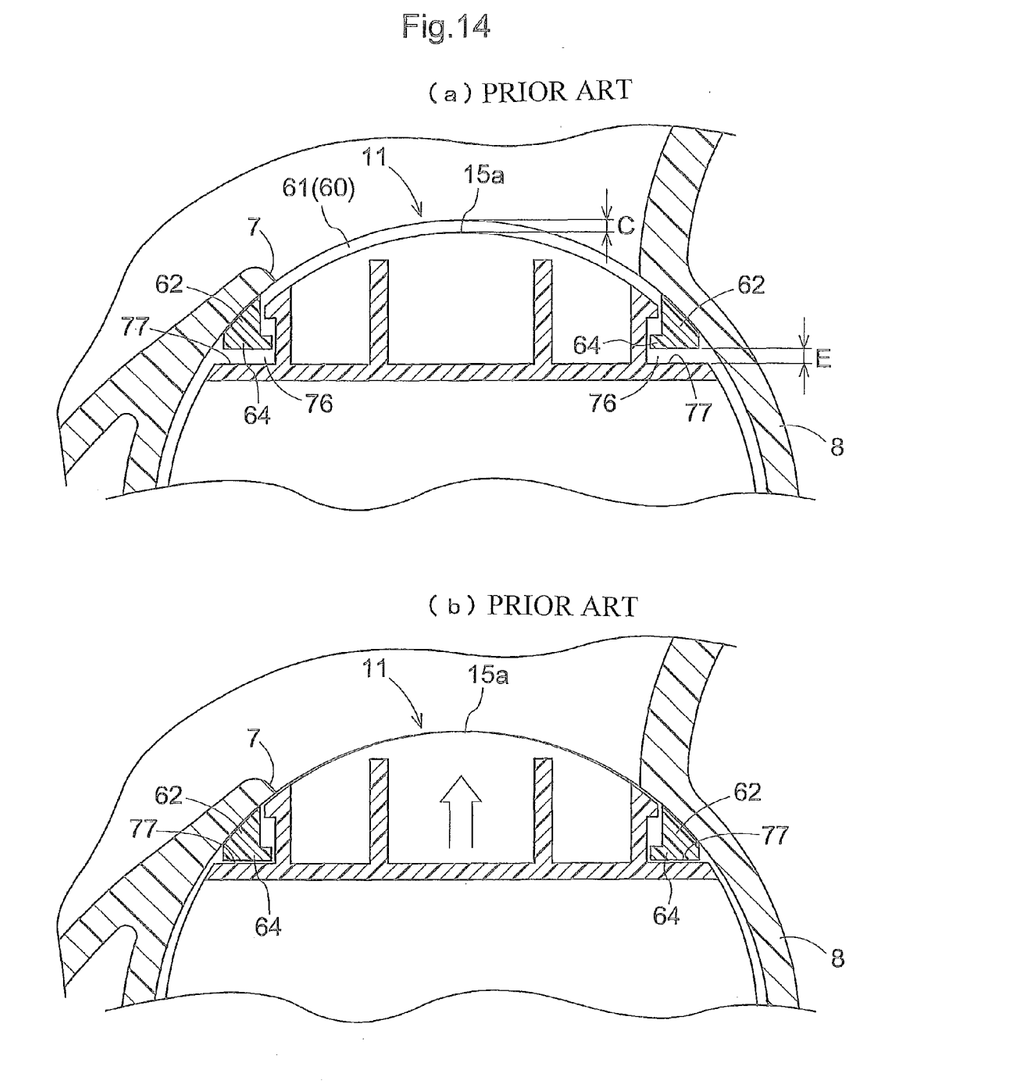
FIG. 14(a) is a sectional view showing a closed condition or position of a conventional valve portion.
FIG. 14(b) is a sectional view showing a displaced condition of the conventional valve portion.

This type of intake apparatus has an arrangement whose general principle is illustrated in FIGS. 14(a) and 14(b). It is to be understood that FIGS. 14(a), 14(b) and the description here are provided for the sole purpose of illustrating the operational principles of prior art and that they do not constitute any admission as to prior disclosure of specific configurations of the apparatus. These figures show how the feed switch opening 7 is closed by a valve portion 11.

As shown, each of the interconnecting portions 62 of a sealing member 60 has an engaging portion 64 disposed on the inner side. Each engaging portion 64 is received by a corresponding recessed portion 76 disposed on the outer peripheral side of the valve portion 11.

A sealing gap E is provided between each engaging portion 64 and an inner face portion 77 of the corresponding recessed portion 76. The inner face portion 77 is located on the side opposite from the other side where the feed switch opening 7 of the intake manifold 1 is located, relative to the engaging portion 64, when the feed switch portion 7 is closed by the valve portion 11.

In general, the valve portions 11 and the sealing members 60 are formed by resin molding. Therefore, if the sealing gap E is small, a engaging portion 64 may come into contact with the corresponding inner face portion 77 of the recessed portion 76 due to manufacturing variations in the valve portions 11 and the sealing members 60. When this happens, the interconnecting portion 62 will be pressed against a bore portion 8, which results in an increase in resistance in the switching operation of the valve portion 11. Therefore, the sealing gap E is configured so as to avoid such contact between the engaging portions 64 and the inner face portions 77, regardless of the manufacturing variations in the valve portions 11 and the sealing members 60.

For this reason, the sealing gap E was conventionally set larger than a valve gap C provided between the outer peripheral edge 15a of each valve portion 11 and the bore portion 8.

In addition, the inner surface of the bore portion 8 and the outer peripheral edge 15a were conventionally arc-shaped and coaxial with their center at the rotational center P of the valve portions 11. A result was a problem illustrated in FIG. 14(b).

Specifically, when the rotary valve is switched to the closed position so that the valve portions 11 close the feed switch openings 7, the rotary valve starts to vibrate due to e.g. pulsation of intake air generated in the air feeding passages caused by operation of the internal combustion engine. As a result, the rotary valve will be deformed such that the valve portions 11 are repeatedly displaced toward and away from the respective feed switch openings 7. The displacement of a valve portion 11 toward the corresponding feed switch opening 7 causes movement of the valve portion 11 relative to the sealing member 60, which leads eventually to collisions of the outer peripheral edge of the valve portion 11 against the bore portion 8 in the vicinity of the feed switch opening 7, thus casing a collision noise.

DISCLOSURE OF THE INVENTION

An object of the present invention is to provide an intake apparatus for an internal combustion engine, which facilitates switching operation of the rotary valve and which can reduce generation of such collision noise described above.

According to an aspect of the present invention, in an intake apparatus for an internal combustion engine, the apparatus comprises an intake manifold including a plurality of air feeding passages that define feed switch openings and a bore portion and that are adapted to be connected to and feed air to a plurality of cylinders of an internal combustion engine when the air feeding passages are connected to the internal combustion engine;

a rotary valve defining an axial direction and including a plurality of valve portions that are rotatable together about a rotational axis and each of which is in communication with corresponding one of the air feeding passages through corresponding one of the feed switch openings, the rotary valve located in the bore portion and being supported to the intake manifold to be rotatably switched between an open position wherein the plurality of valve portions open the feed switch opening and a closed position wherein the plurality of valve portions close the feed switch openings, each of the valve portions including a closing area portion for closing the corresponding feed switch opening and an open area portion for opening the corresponding feed switch opening wherein a first distance from a first central portion, with respect to a peripheral direction of the valve portions, of an outer peripheral edge of the closed area portion to the rotational axis is set smaller than a second distance from a second central portion, with respect to the peripheral direction, of an outer peripheral edge of the open area portion to the rotational axis;

a sealing member fitted to each of the valve portions, the sealing member including a pair of ring portions, each of which engages corresponding one of opposite ends of the valve portion in the axial direction and at least two interconnecting portions interconnecting the pair of ring portions, each of the sealing members providing sealing between associated one of valve portions and the bore portion of the intake manifold, the interconnecting portions being generally located along the feed switch opening and radially between the valve portion and the bore portion when the rotary valve is switched to the closed position; and a pair of recessed portions defined on an outer side of each of the valve portions for receiving engaging portions defined on inner sides of the interconnecting portions of each of the sealing members.

With the arrangement described above, when the closed area portion is to close the corresponding switch feed opening, the closed area portion can be located farther from the feeding switching opening in comparison with the open area portion for opening the feeding switching opening. Thus, it is more difficult for the valve portion to collide with the bore portion in the event that the valve portion is displaced toward the feeding switching opening. Further, when the open area portion opens the feeding switching opening, because of the smaller gap between the valve portion and the bore portion in the vicinity of the feed switch opening, there would be less air turbulence in the vicinity of the feed switch opening. Consequently, this arrangement allows an intake apparatus to have improved performance where air is supplied to the internal combustion engine more quietly and with stability.

According to an aspect of the present invention, the outer peripheral edge of the open area portion of the valve portion is formed as an arc-shaped edge centered at the rotational axis.

Thus, the open area portion can be aligned with the feed switch opening with better precision, so that the air turbulence in the vicinity of the feeding switching opening can be reduced even more effectively. Consequently, an intake apparatus with this arrangement can supply air to the internal combustion engine more quietly.

According to an aspect of the present invention, the valve portion includes a reinforcing area portion disposed on a side opposite from the closed area portion relative to the valve rotational axis, and a third distance from a third central portion, with respect to the peripheral direction, of an outer peripheral edge of the reinforcing area portion to the rotational axis is set smaller than the second distance.

Thus, the valve portion can be reinforced in a way that makes it easy to balance weights of the reinforcing area portion and the closed area portion. As a result, the stiffness of the valve portion can be improved and thus reducing deformation of the rotary valve. Furthermore, the rotational balance of the rotary valve can be improved, thus facilitating rotation and switching of the rotary valve. Further, a third distance from a third central portion, with respect to the peripheral direction, of an outer peripheral edge of the reinforcing area portion to the rotational axis is set smaller than the second distance which is from a second central portion, with respect to the peripheral direction, of an outer peripheral edge of the open area portion to the rotational axis. This arrangement makes it possible to effectively prevent generation of collision noise between the reinforcing area portion of the valve portion and the bore portion resulting from the deformation of the rotary valve.

According to an aspect of the present invention, when the rotary valve is switched to the closed position, a sealing gap between the ladder engaging portion and an inner face portion of the recessed portion located, with respect to the ladder engaging portion, on the side opposite from the side where the feed switch opening is present is smaller than a valve gap provided between the valve portion and the bore portion, and the first distance is set greater than the third distance.

Thus, even when the valve portion is deformed toward the feed switch opening, if this deformation reaches the amount of the sealing gap, the inner face portion comes into contact with the engaging portion, whereby the interconnecting portions prevent further movement of the valve portion, thereby making it more difficult to have further displacement of the valve portion toward the bore portion. The first distance from a first central portion, with respect to a peripheral direction of the valve portions, of an outer peripheral edge of the closed area portion to the rotational axis is set greater than the third distance from a third central portion, with respect to the peripheral direction, of an outer peripheral edge of the reinforcing area portion to the rotational axis. This allows a sufficient distance between central portion of the outer peripheral edge of the reinforcing portion and the bore portion, which helps reducing collision noise between the valve portion and the bore portion.

BRIEF DESCRIPTION OF THE DRAWINGS

The foregoing and additional features and characteristics of the present invention will become more apparent from the following detailed description considered with reference to the accompanying drawings, wherein.

BEST MODE FOR CARRYING OUT THE INVENTION

Next, embodiments of the present invention will be described with reference to the accompanying drawings. In the following description, a term "portion", if not explicitly specified, may be an integral part of a member or may be formed as a separate part. When something is said to be "defined" by an object, if not explicitly specified, it may be actually defined by the object or may be defined by a separate part which may be considered to be a part of the object.

First Embodiment

Figure 1:
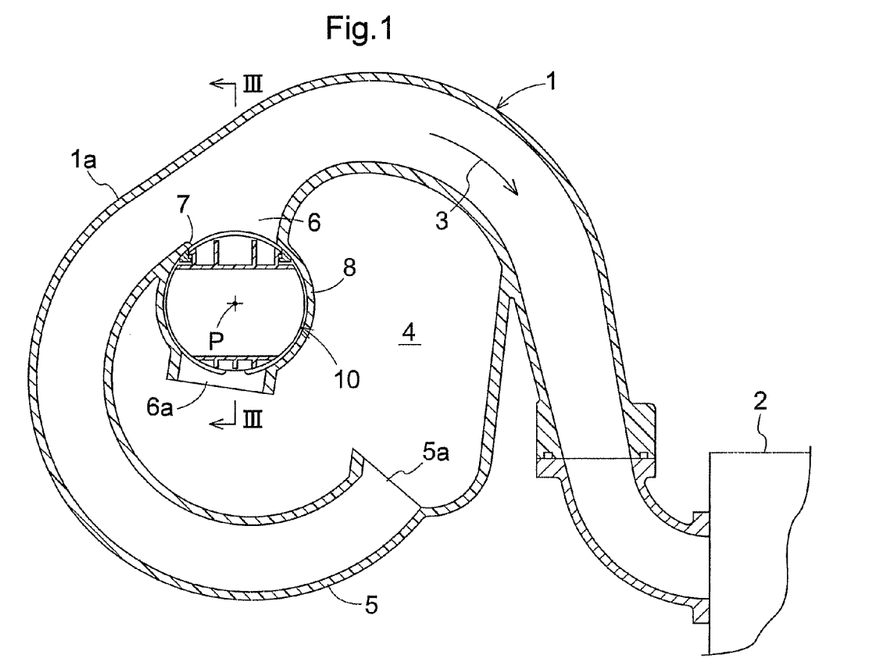
FIG. 1 is a vertical sectional view of an intake apparatus for an internal combustion engine.
Figure 3:
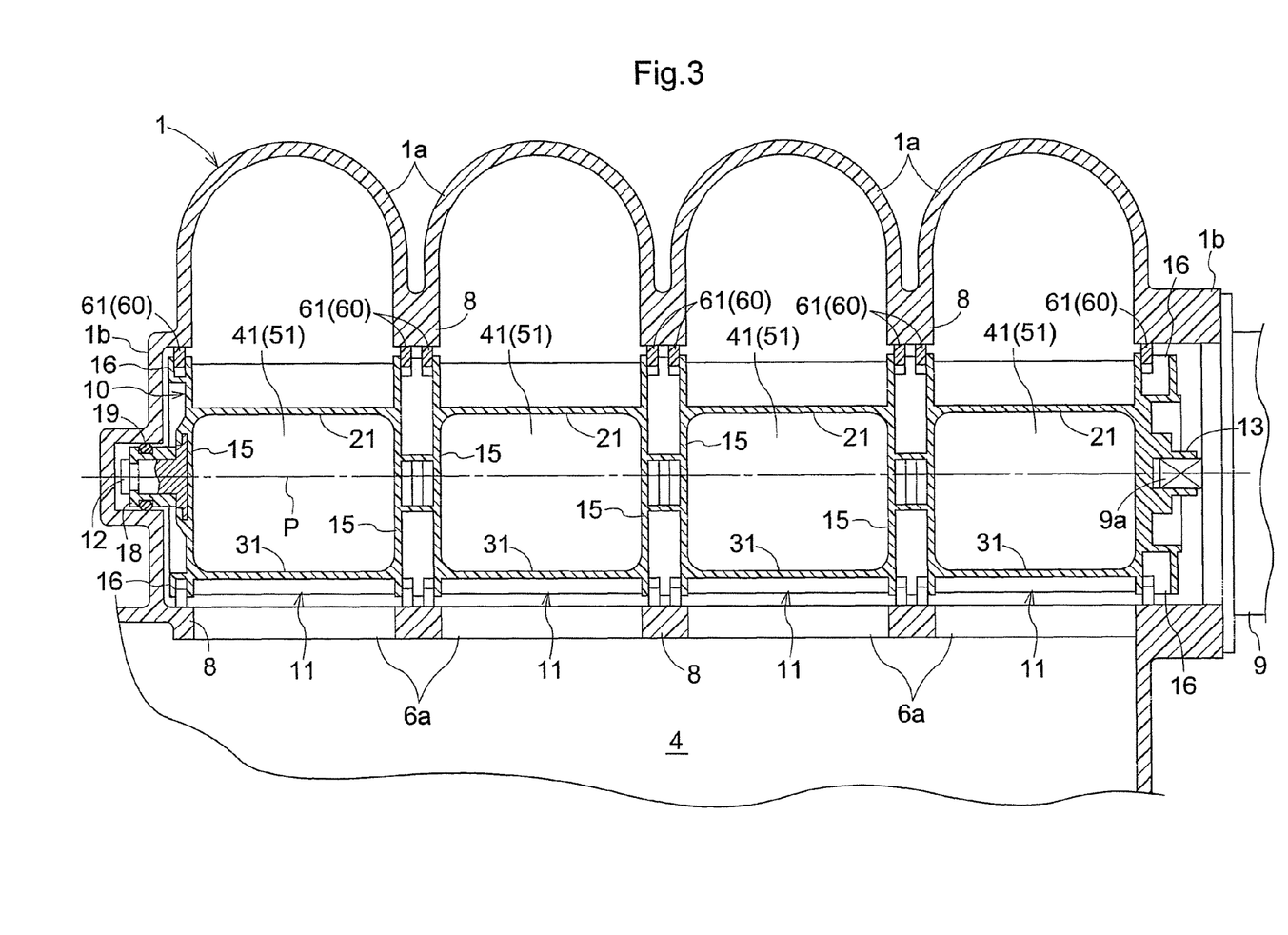
FIG. 3 is a sectional view taken along III-III in FIG. 1.

FIG. 1 is a vertical sectional view showing an intake apparatus for an internal combustion engine in accordance with an embodiment of the present invention. FIG. 3 is a sectional view taken at III-III in FIG. 1. As shown in these figures, the intake apparatus for an internal combustion engine in accordance with the embodiment of the invention includes an intake manifold 1 and a rotary valve 10 incorporated within this intake manifold 1 and the apparatus is mounted to a four-cylinder type internal combustion engine 2.

The intake manifold 1 includes four intake pipe-like or tubular members 1a connected in series and integrally formed with each other, with these four intake pipe-like members 1a forming four air feeding passages or conduits 3 connected respectively to the four cylinders of the internal combustion engine 2. As shown in FIG. 1, the intake manifold 1 further includes a surge tank 4 connected to the four intake pipe-like members 1a. Each air feeding passage 3 includes a long port 5 having an inlet opening 5a that opens to the surge tank 4 and a short port 6 having an inlet opening 6a that opens to the surge tank 4. The four intake pipe-like members 1a and the surge tank 4 of the intake manifold 1 are formed by resin molding.

The rotary valve 10 is supported to a pair of axial bearing portions 1b of the intake manifold 1 with the rotary valve 10 being inserted into and through a bore portion 8 having feed switch openings 7 for the respective short ports 6. Further, this rotary valve 10 is rotatably driven about an axis P by means of an actuator 9 having an output shaft 9a operatively coupled with a support shaft 13 provided at one extreme end of this rotary valve 10, so that the rotary valve 10 is switched between a closed condition or a closed position where each feed switch opening 7 of the respective short port 6 is closed and an open condition or a closed position where each feed switch opening 7 of the respective short port 6 is closed.

When the internal combustion engine 2 rotates at a low speed, the rotary valve 10 is switched to the closed condition or closed position to close each short port 6 so that it is no longer communicated with the surge tank 4, which switches each air feeding passage 3 to an air feeding mode for low speed (or a low speed air feeding mode). As a result, each air feeding passage 3 feeds air, which is introduced into the surge tank 4 from a throttle (not shown), to the cylinders as combustion air through the long port 5 by the suction action of the cylinders. When the internal combustion engine 2 rotates at a high speed, the rotary valve 10 is switched to the open condition or the open position to open each short port 6 to be in communication with the surge tank 4, which switches each air feeding passage 3 to an air feeding mode for high speed (or a high speed air feeding mode). As a result, each air feeding passage 3 feeds air, which is introduced to the surge tank 4, to the cylinders as combustion air through the short port 6 by the suction action of the cylinders. In case of the high-speed air feeding mode, the long port 5 in each air feeding passage is also communicated with the surge tank 4.

Figure 8:
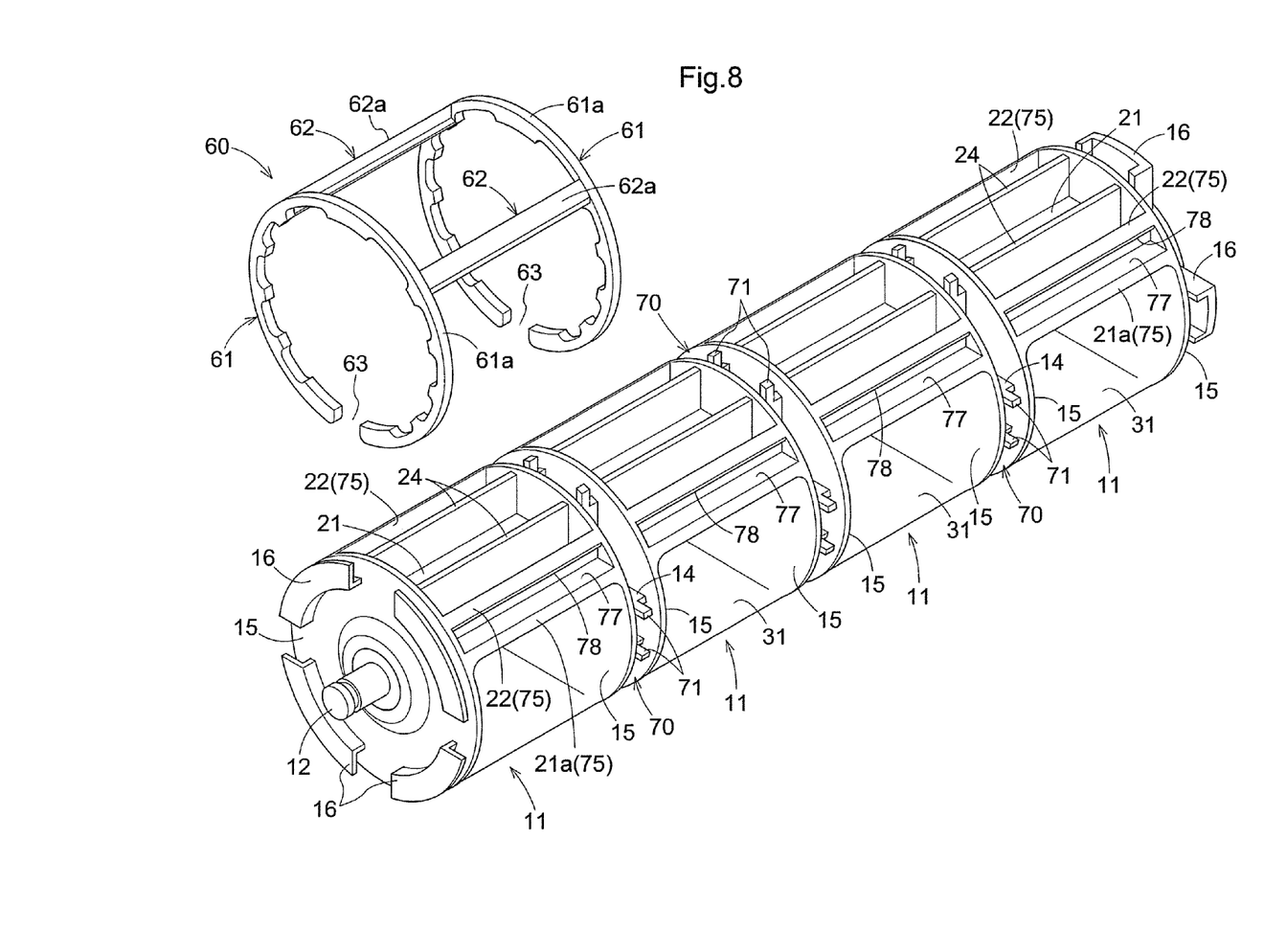
FIG. 8 is an overall perspective view of the rotary valve and a sealing member.
Figure 9:
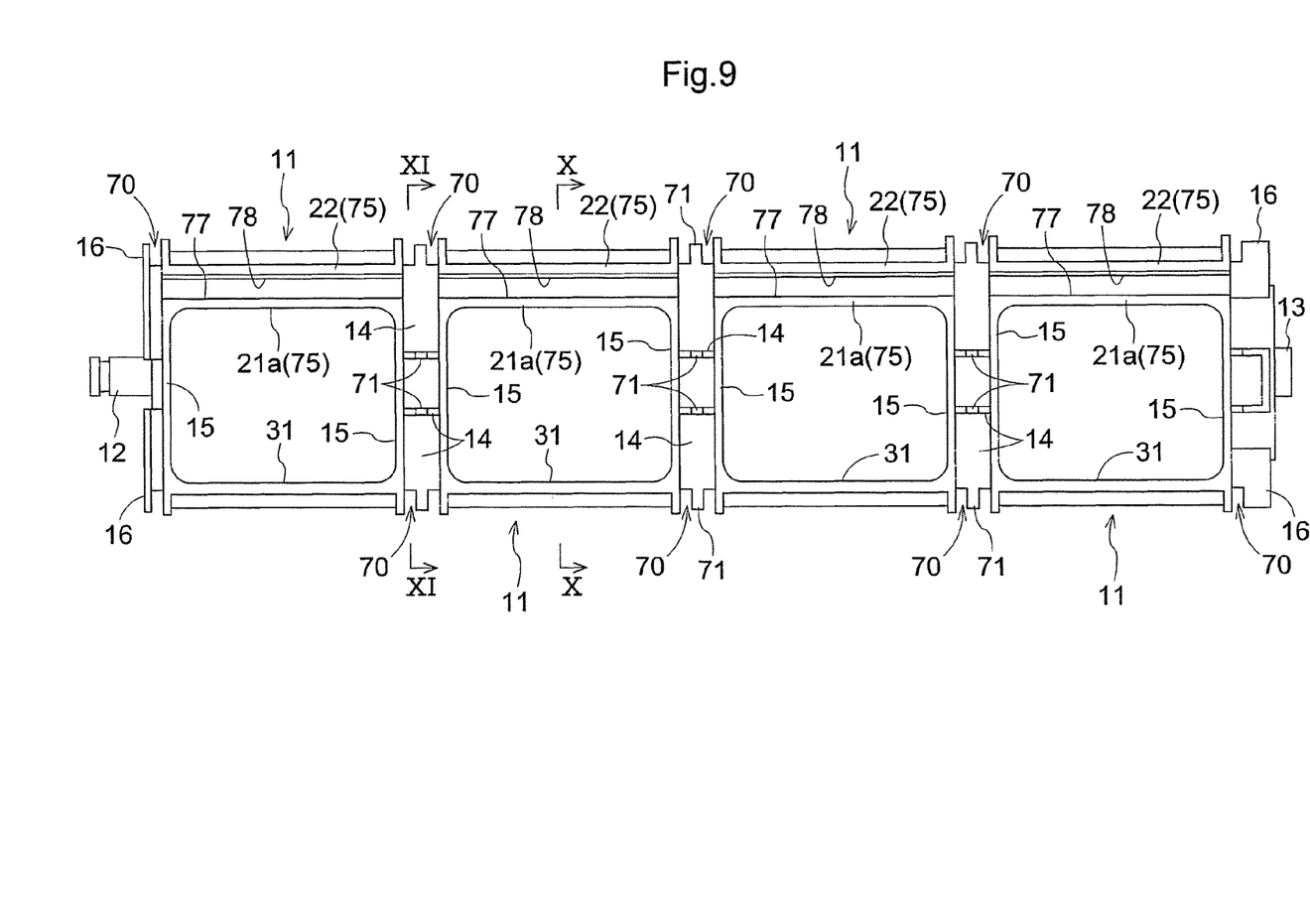
FIG. 9 is a front view of the rotary valve.
Figure 10:
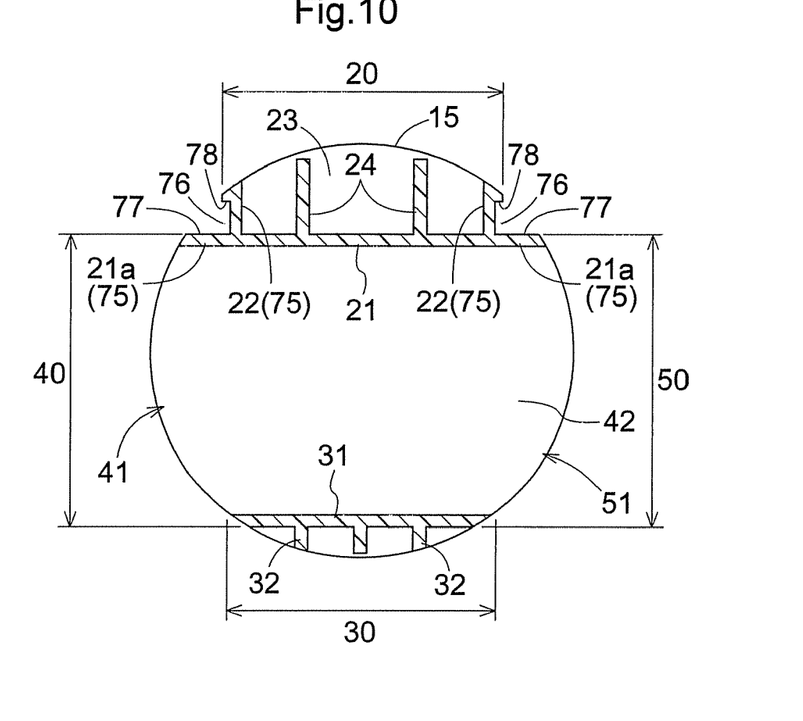
FIG. 10 is a sectional view taken along X-X in FIG. 9.
Figure 11:
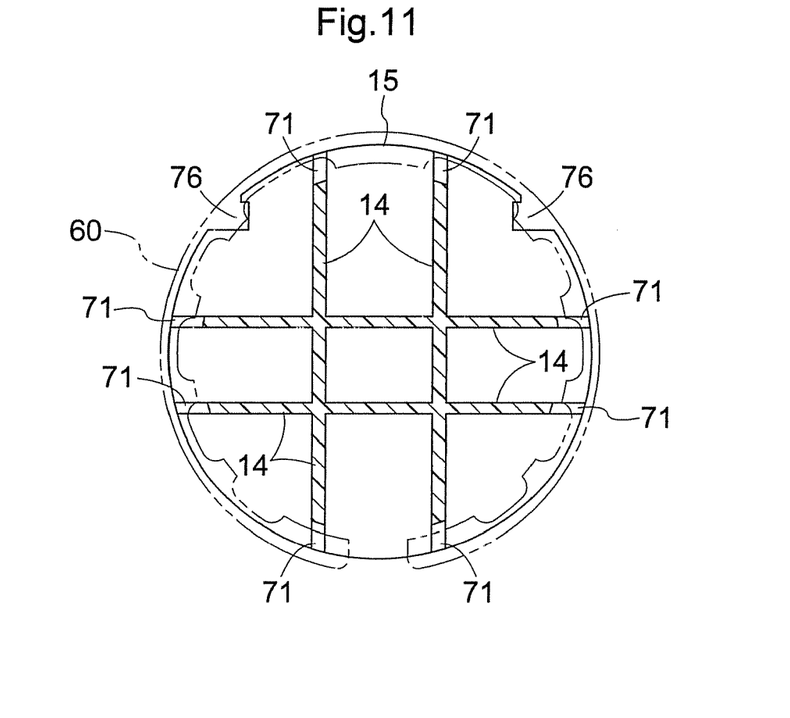
FIG. 11 is a sectional view taken along XI-XI in FIG. 9.

Next, the rotary valve 10 will be described in greater details. FIG. 3 shows a vertical section of the rotary valve 10. FIG. 8 is a perspective view showing the entire rotary valve 10. FIG. 9 is a front view showing the entire rotary valve 10. FIG. 10 is a sectional view taken along X-X in FIG. 9. FIG. 11 is a sectional view taken along XI-XI in FIG. 9.

As shown in these figures, the rotary valve 10 includes four valve portions 11 juxtaposed coaxially along the direction of the rotary axis P of this rotary valve 10 and the support shafts 12, 13 provided at the opposed ends of the rotary valve 10 to be rotatably supported to the axial bearing portions 1b of the intake manifold 1. The four valve portions 11 are formed by resin molding. Further, the four valve portions 11 are interconnected by a plurality of connecting members 14 formed by resin molding simultaneously and integral with the valve members 11 and juxtaposed along the peripheral direction of the valve portions 11 between respective adjacent valve portions 11, so that the valve portions 11 are rotatable together. The one support shaft 12 is a metal support shaft having one end thereof rotatably embedded in the extreme end of the rotary valve 10. This support shaft 12 is rotatably supported in a support hole formed in the axial bearing portion 1b via a resin bearing 18 and an O-ring 19 for axial alignment. The support hole of the axial bearing portion 1b is formed as a recessed portion configured to prevent air leak to the outside of the intake manifold. The other support shaft 13 is formed integrally with the extreme end of the rotary valve 10 by resin molding. This support shaft 13 is supported to the axial bearing portion 1b via the output shaft 9a of the actuator 9. The four valve portions 11 correspond respectively to the four short ports 6 and open and close the feed switch openings 7. The rotary valve 10 includes a plurality of side plate portions 15 disposed side by side and spaced apart along the direction of its rotational axis P. And, the rotary valve 10 is tapered with the side wall portion 15 disposed adjacent one end where the one support shaft 12 is present has an outer diameter slightly smaller than an outer diameter of the side wall portion 15 disposed at the other end where the other support shaft 13 is present.

Each valve portion 11 includes a closed area portion 20 having a bottom plate member 21, a reinforcing area portion 30 disposed on the opposite side from the closed area portion 20 with respect to the rotational axis P which is the rotational axis of the valve portion 11, an open area portion 40 disposed between and defined by the reinforcing area portion 30 and the closed area portion 20 and having a port hole 41, and a communicating area portion 50 disposed on the opposite side from the open area portion 40 with respect to the rotational axis P of the valve portion 11 and having a communication hole 51. The communicating area portion 50 is preferably in unobstructed or uninterrupted communication with the open area portion 40. Each bottom plate member 21 may have a flat surface that faces and defines a part of the open area portion 40 and communicating area portion 50.

The closed area portion 20 is defined by a pair of side plate portions 15 disposed at the opposed ends of the valve portion 11, the bottom plate member 21 formed continuously with the pair of the side plate portions 15, and a pair of wall plate members 22 disposed at opposed ends in the peripheral direction of the valve portion on the outward facing surface of the bottom plate member 21 such that the wall plate members 22 extend away from and preferably perpendicular to the bottom plate member 21. This closed area portion 20 includes a recessed portion 23 (FIG. 10) defined between the wall plate members 22 on the outer face side of the bottom plate member 21 and a plurality of reinforcing ribs 24 provided within the recessed portion 23 and on the outer face side of the bottom plate member 21 such that reinforcing ribs 24 extend away from and preferably perpendicular to the bottom plate member 21.

The reinforcing area portion 30 is defined by the pair of side plate portions 15, and a reinforcing plate member 31 formed continuously with an adjacent pair of side plate portions 15. And, this reinforcing area portion 30 includes a plurality of reinforcing ribs 32 juxtaposed on the outer face side of the reinforcing plate 31 such that the reinforcing ribs 32 are spaced apart in the peripheral direction of the valve portion 11.

The open area portion 40 includes one radial end portion of a cylindrical member 42 defined by the pair of side plate portions 15, the bottom plate member 21, and the reinforcing plate member 31, and the port 41 which is an opening provided at one radial end portion of the cylindrical member 42. The communicating area portion 50 includes a radial end portion on the opposite side of the cylindrical member 42 and the communication hole 51 which is an opening provided at the radially opposite end portion of the cylindrical member 42. The port 41 and the communication hole 51 are communicated with each other via the cylindrical member 42.

Figure 12:
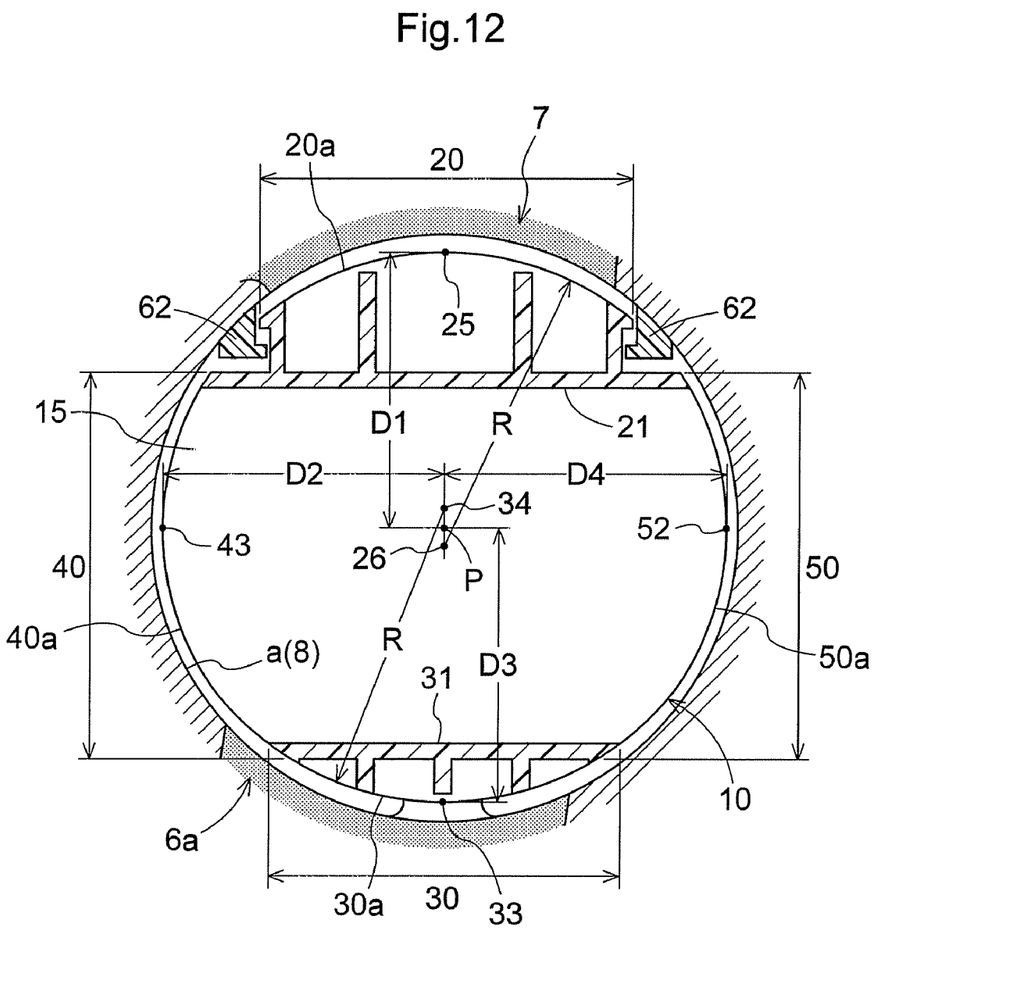
FIG. 12 is a sectional side view of the valve portion.

FIG. 12 is a sectional side view of each bore portion 8. A solid line (a) in this figure denotes the inner peripheral face of the bore portion 8. As shown in this figure, the bore portion 8 has an inner face which is circular with its center at the rotational axis P of the valve portion 11 as seen in the direction along this rotational axis P. On the other hand, the valve portion 11 has an outer peripheral shape with different distances D1, D3, D2 from the rotational axis P to outer peripheral edges 20a, 30a, and 40a of the closed area portion 20, the reinforcing area portion 30 and the open area portion 40 respectively.

More particularly, the distance D1 is a distance from the rotational axis P to a center portion 25 (or a central point), with respect to the peripheral direction of the valve portion, of the outer peripheral edge 20a of the closed area portion 20. The distance D2 is a distance from the rotational axis P to a center portion 43 (or a central point), with respect to the peripheral direction of the valve portion, of the outer peripheral edge 40a of the open area portion 40. The distance D3 is a distance from the rotational axis P to a center portion 33 (or a central point), with respect to the peripheral direction of the valve portion, of the outer peripheral edge 30a of the reinforcing area portion 30. And, the outer peripheral shape of the valve portion 11 is formed such that D2 is greater than D1 and that D1 is greater than D3 among the distance D1 for the closed area portion 20, the distance D2 for the open area portion 40 and the distance D3 for the reinforcing area portion 30. Further, a distance D4 is a distance from the rotational axis P to a center portion 52, with respect to the peripheral direction of the valve portion, of an outer peripheral edge 50a of the communicating area portion 50. And, this distance D4 is set to be the same as the distance D2 for the open area portion 40.

The outer peripheral edges 40a, 50a of the open area portion 40 and the communicating area portion 50 are formed as arc-shaped outer peripheral edges centered at the rotational axis P. The outer peripheral edge 20a of the closed area portion 20 has its center 26 at a position away from the rotational axis P toward the side where the reinforcing area portion 30 is present and is formed as an arc-shaped outer peripheral edge having the same radius R as the inner peripheral face of the bore portion 8. The outer peripheral edge 30a of the reinforcing area portion 30 has its center 34 at a position away from the rotational axis P toward the side where the closed area portion 20 is present and is formed as an arc-shaped outer peripheral edge having the same radius R as the inner peripheral face of the bore portion 8.

As shown in FIG. 3, the rotary valve 10 includes a sealing member 60 attached to each valve portion 11. FIG. 8 is a perspective view showing the sealing member 60 in its entirety. As shown in this figure, the sealing member 60 has a pair of circular ring portions 61 and a pair of interconnecting portions 62 interconnecting the pair of ring portions 61. The interconnecting portions 62 will be referred to as ladder portions 62. However, while an exemplary structure of the ladder portions will be described below, the term ladder per se is not limiting as to their shapes. The pair of ring portions 61, 61 and the pair of ladder portions 62 are formed integrally by resin molding. Each ring portion 61 has an opening or a cut out 63 disposed on a radially opposite side from the side where the pair of ladder portions 62 are present, with respect to the center of this ring portion 61. Each ladder portion 62 has an outer peripheral face or edge 62a which is formed as an arcuate face which is preferably substantially circular except for the opening or the cut out 63 as viewed along the direction of the rotational axis P of the valve portion 11. The outer diameter of the sealing member 60 at each ladder portion 62, that is, a distance between an outer surface of each ladder portion 62 and the center of the ring portion 61 is set slightly smaller than the outer diameter thereof at each ring portion 61.

The sealing member 60 of each valve portion 11 is attached to the valve portion 11 by the following attaching arrangement. This attaching arrangement is shown in FIGS. 3 through 11.

As shown in these figures, a ring support portion 70 is provided on each axially outer side of the side plate portion 15 at each opposite end of the valve portion 11. Each ring support portion 70 disposed between adjacent valve portions 11 is defined by the side plate portion 15, each connecting member 14 and a pin member 71 formed continuously with the associated connecting member 14. This ring support portion 70 is provided in the form of an annular groove including a groove bottom defined by end faces of each connecting member 14 and side walls defined by the side plate portion 15 and the pin member 71. The ring support portion 70 included in each of the valve portions 11 disposed at the opposite ends of the rotary valve 1 on the side thereof opposite from the adjacent valve portion 11 is defined by the side plate portion 15 and a plurality of support members 16 distributed on the axially outer face side of this side plate portion 15 along the peripheral direction of the valve portion 11. This ring support portion 70 is provided in the form of an annular groove including a groove bottom defined by the side plate of each support member 16 and a side wall defined by the side plate portion 15.

Figure 5:
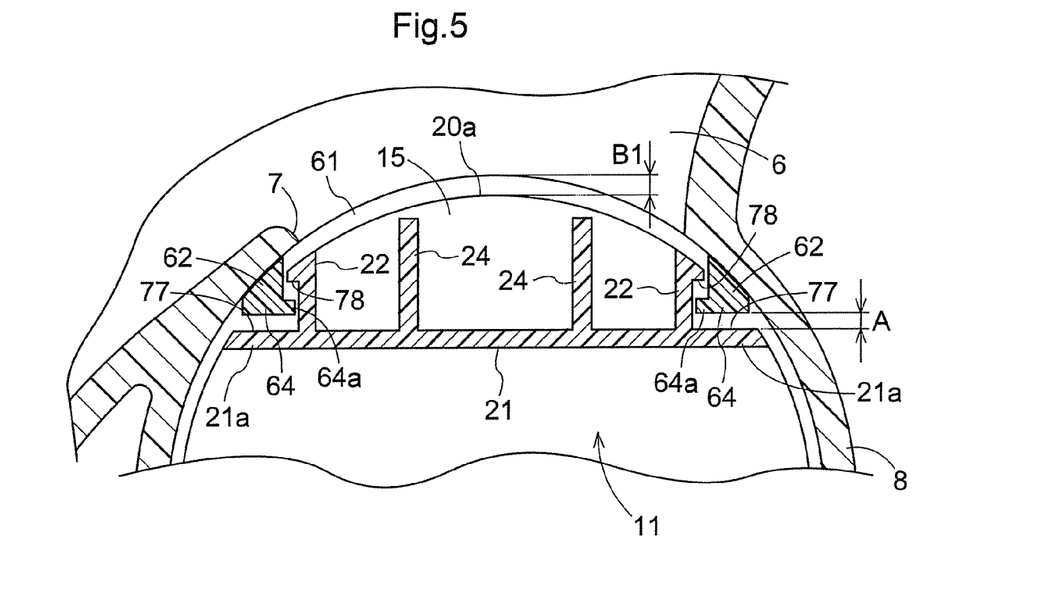
FIG. 5 is a sectional view showing a closed condition or a closed position of a valve portion.

FIGS. 3, 5 and 11 illustrate the valve portions 11 with the respective sealing members 60 attached or fitted. In FIG. 11, the ring portion 61 is shown with dotted lines. As shown in these figures, each of the pair of ring portions 61 is fitted to, or engages and rests on corresponding one of the pair of ring support portions 70, 70 from radially outside. Each ring portion 61 is elastically deformed to have a reduced diameter by a force applied thereto due to its contact with the bore portion 8. The deformation is allowed by the opening or the cut out 63. The ring portion 61 engages, mounted to, or fits onto the ring support portion 70 from radially outside under this elastically deformed condition. As a result, an outer peripheral face 61a of each ring portion 61 is pressed against the inner face of the bore portion 8. To fit the ring portion 61 onto the ring support portion 70, the ring portion 61 is elastically deformed to increase the diameter and to enlarge the opening 63, so that the ring member 61 may engage the ring support portion 70 from radically outside through the enlarged opening 63.

Figure 6:
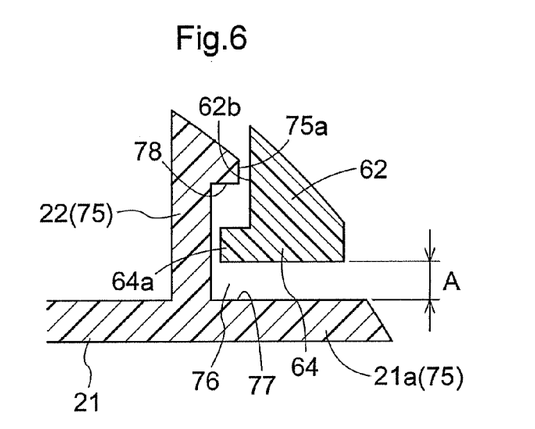
FIG. 6 is a sectional view showing a ladder engaging portion and a ladder receiving recessed portion.

As shown in FIG. 5, each ladder portion 62 includes, on the inner side of the sealing member, a ladder engaging portion 64 (or an engaging portion) extending along the entire length of the ladder portion 62. This ladder engaging portion 64 includes a ridge or an elongate projection 64a extending along the entire length of the ladder portion 62. The ridges or the elongate projections 64a of the pair of ladder portions 62 project toward each other in an axial view. On the other hand, as best seen in FIG. 6, the valve portion 11 includes a pair of ladder support portions 75 disposed on the outward sides of the closed area portion 20 in the valve rotational direction. Each ladder support portion 75 is defined by an end portion 21a of the bottom plate member 21 and the wall plate member 22. In the valve portion outer face side of each ladder support portion 75, there is provided a ladder receiving recessed portion 76 (or a recessed portion). Each of the pair of ladder engaging portions 64 is engaged and received in the respective one of the pair of ladder receiving recessed portions 76.

Figure 4:
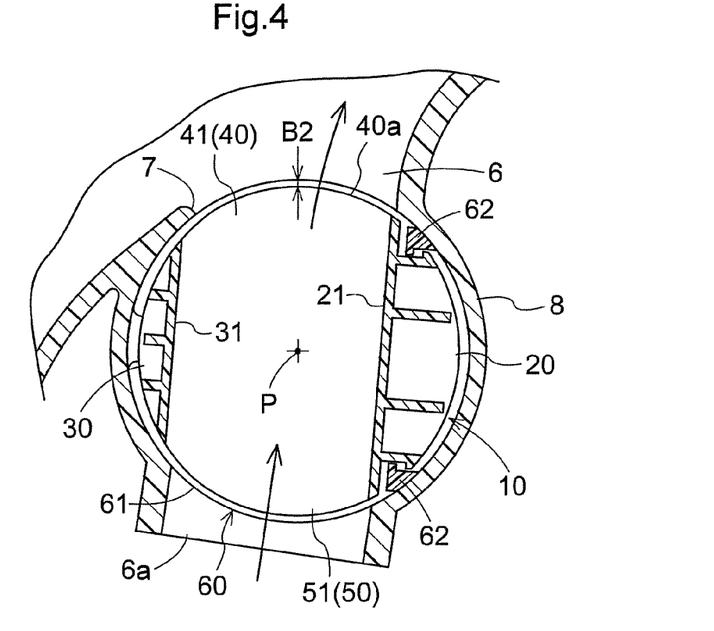
FIG. 4 is a sectional view showing an open condition of the short ports.

FIG. 4 is a sectional view showing each short port 6 and each valve portion 11 when the rotary valve 10 is switched to the open condition or the open position.

As shown in this figure, when the rotary valve 10 is switched to the open condition or the open position, the open area portion 40 of the valve portion 11 faces the feed switch opening 7, thus opening the feed switch opening 7 through the port 41. At this time, the communication hole 51 of the communicating area portion 50 faces the inlet opening 6a of the short port 6 and the feed switch opening 7 is in communication with the inlet opening 6a. At this time, the outer peripheral faces of the two ring portions 61 of the sealing member 60 project radially beyond the outer peripheral edge of the open area portion 40 to the outer periphery side of the open area portion 40 so as to be in contact with the inner peripheral faces of the bore portion 8 at positions along end regions of the feed switch opening 7 in the rotational axis direction of the valve portion 11 due to the elastic force from the ring portion 61. As a result, the ring portions 61 seal the gaps between the valve portion 11 and the bore portion 8 on the both end sides of the feed switch opening 7 in the direction of the rotational axis of the valve portion, thereby reducing turbulence, in the vicinity of the feed switch opening 7, in the air fed to the internal combustion engine 2 through the short port 6. Further, under this condition, in the valve portion 11, a valve gap B2 is formed between the center 43 of the outer peripheral edge 40a of the opening area portion 40 and the inner peripheral face of the bore portion 8.

Figure 2:
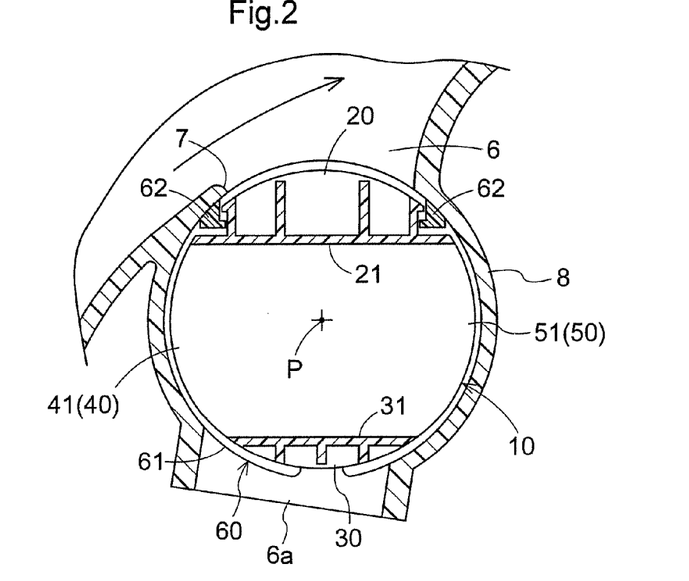
FIG. 2 is a sectional view showing a closed condition of short ports.

FIGS. 2 and 5 are sectional views showing each short port 6 and each valve portion 11 when the rotary valve 10 is switched to the closed condition or the closed position.

As shown in these figures, when the rotary valve 10 is switched to the closed condition or the closed position, the closed area portion 20 of the valve portion 11 faces the feed switch opening 7, thus closing the feed switch opening 7 with the side plate portion 15, the wall plate member 22 and the bottom plate member 21. At this time, the outer peripheral faces of the two ring portions 61 of the sealing member 60 project radially beyond the outer peripheral edge 20a of the closed area portion 20 to the outer periphery side of the closed area portion 20 so as to be in contact with the inner peripheral faces of the bore portion 8 at positions along end regions of the feed switch opening 7 in the rotational axis direction of the valve portion 11 due to the elastic resilience force from the ring portion 61. On the other hand, the pair of ladder portions 62, 62 are disposed on the opposite sides of the feed switch opening 7 with respect to the peripheral direction of the valve portion 11 and disposed between the valve portion 11 and the bore portion 8 at positions on one side of the feed switch opening 7 in the peripheral direction of the valve portion 11. As a result, the ring portions 61 seal the gaps between the valve portion 11 and the bore portion 8 on both end sides of the feed switch opening 7 in the direction of the rotational axis of the valve portion 11 and the ladder portions 62 seal the gaps between the valve portion 11 and the bore portion 8 on both end sides of the feed switch opening 7 in the peripheral direction of the valve portion 11. However, the outer peripheral face 62a of each ladder portion 62 is slightly receded toward the inner side of the valve portion 11 than the outer peripheral face 61a of the ring portion 61, thus is not in contact with the inner peripheral face of the bore portion 8.

FIGS. 5 and 6 show how each ladder engaging portion 64 engages with the ladder receiving recessed portion 76 when the rotary valve 10 is switched to the closed condition or the closed position.

As shown in these figures, the inner faces of the ladder receiving recessed portion 76 includes a first inner face portion 77 that is disposed on the side opposite from the side where the feed switch opening 7 is present relative to the ladder engaging portion 64 when the feed switch opening 7 is closed by the valve portion 11. That is, the first inner face portion 77 faces the ladder engaging portion 64. A first sealing gap A is provided between the first inner face portion 77 and a portion of the ladder engaging portion 64 facing the first inner face portion 77. The first sealing gap A is provided along the entire length of the first inner face portion 77 along the direction of the rotational axis of the valve portion 11. On the other hand, the valve portion 11 is constructed such that a valve gap B1 is present between the center portion 25 of the outer peripheral edge 20a of the closed area portion 20 and the inner peripheral face of the bore portion 8. This valve gap B1 is greater than the gap B2 when the feed switch opening 7 is opened by the open area portion 40. With the rotary valve 10 in its closed condition or the closed position, the first sealing gap A is smaller than the valve gap B1.

When the rotary valve 10 is switched to the closed condition or the closed position, an end 75a of one ladder support portion 75 comes into contact with an end face 62b of the ladder portion 62 of the sealing member 60, whereby the sealing member 60 is rotated together with the valve portion 11.

Figure 7:
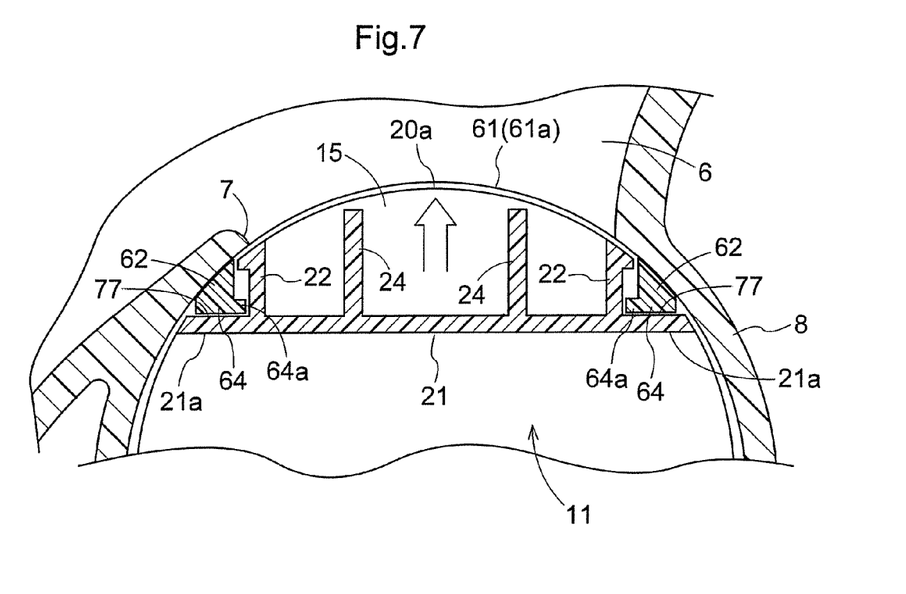
FIG. 7 is a sectional view showing a displaced condition of the valve portion.

When the valve portion 11 closes the feed switch opening 7, due to e.g. pulsation in the introduced air in the respective air feed passages 3 caused by operation of the internal combustion engine 2, a vibrations develop about the portions at opposite ends of the rotary valve 10 supported by the support shafts 12, 13. This causes the valve portion 11 and the sealing member 60 to move relative to each other within the grooves of the ring support portions 70 and inside the ladder receiving recessed portion 76. This causes deformation in the rotary valve 10 wherein each valve portion 11 repeatedly moves toward and away from the feed switch opening 7. FIG. 7 shows the valve portion 11 that is displaced toward the feed switch opening 7. Since the valve gap B1 before the displacement of the valve portion 10 is greater than the valve gap B2 with the feed switch opening opened by the open area portion 40, the closed area portion 20 does not collide with the bore portion 8 regardless of the displacement of the valve portion 11. Further when the displacement of the valve portion 11 reaches the sealing gap A, the first inner face portion 77 of the ladder receiving recessed portion 76 comes into contact with the ladder engaging portion 64. Since the outer peripheral face 61a of each ring portion 61 of the sealing member 60 is in contact with the corresponding inner peripheral face of the bore portion 8, the ladder portions 62 function as stoppers against further displacement of the first inner face portion 77, thus limiting further displacement of the valve portion 11. Since the sealing gap A prior to the deformation of the valve portion 11 is smaller than the valve gap B1, collisions between the closed area portion 20 of the valve portion 11 and the bore portion 8 are further reduced in spite of the displacement of the valve portion 11.

Second Embodiment

Figure 13:
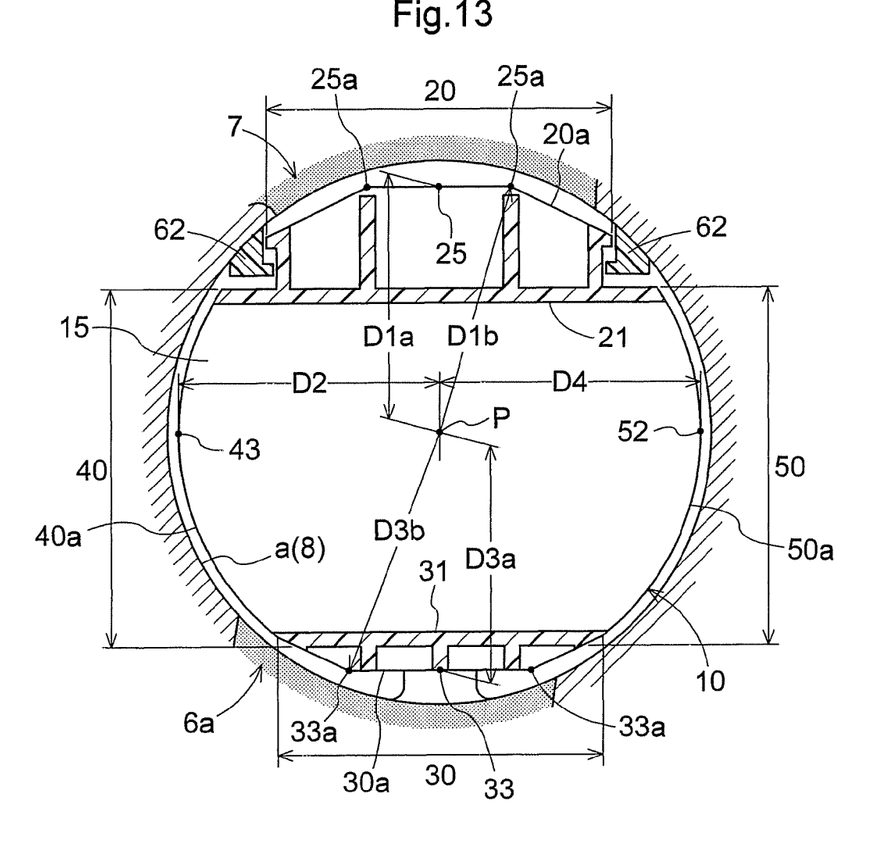
FIG. 13 is a sectional side view of valve portions of a rotary valve according to the second embodiment.

FIG. 13 is a sectional side view of a bore portion 8 of an intake apparatus for an internal combustion engine according to the second embodiment. A solid line (a) in this figure denotes the inner peripheral face of the bore portion 8.

As shown in this figure, the bore portion 8 has a circular inner face that is centered at the rotational axis P of the valve portion 11 as seen in the direction along this rotational axis P. On the other hand, the valve portion 11 has an outer peripheral shape with different distances D1a, D3a, D2 from the rotational axis P to outer peripheral edges 20a, 30a, 40a respectively of the closed area portion 20, the reinforcing area portion 30 and the open area portion 40.

More specifically, the distance D1a is a distance from the rotational axis P to a center portion 25 (or a central point), with respect to the peripheral direction of the valve portion, of the outer peripheral edge 20a of the closed area portion 20. The distance D2 is a distance from the rotational axis P to a center portion 43 (or a central point), with respect to the peripheral direction of the valve portion, of the outer peripheral edge 40a of the open area portion 40. The distance D3a is a distance from the rotational axis P to a center portion 33 (or a central point), with respect to the peripheral direction of the valve portion, of the outer peripheral edge 30a of the reinforcing area portion 30. The outer peripheral shape of the valve portion 11 is such that D2 is greater than D1a, and that D1a is greater than D3a among the distance D1a for the closed area portion 20, the distance D2 for the open area portion 40 and the distance D3a for the reinforcing area portion 30. Further, a distance D4 is a distance from the rotational axis P to a center portion 52, with respect to the peripheral direction of the valve portion, of an outer peripheral edge 50a of the communicating area portion 50. This distance D4 is set to be the same as the distance D2 for the open area portion 40.

The outer peripheral edges 40a, 50a of the open area portion 40 and the communicating area portion 50 are formed as arc-shaped outer peripheral edges centered at the rotational axis P. The outer peripheral edge 20a of the closed area portion 20 has outer peripheral edges formed by taking an arc centered about the rotational axis P and having the same radius as the radius of the outer peripheral edge 40a of the open area portion 40 and by drawing three straight chords each ending at two of adjacent points out of four points (including the two points 25a) positioned over the arc and by removing regions between the arc and the chords. The distance D1b from the rotational axis P to the outer peripheral edge 20a of the open area portion 20 at two points 25a, 25a thereof is greater than the distance D1a described above. The outer peripheral edge 30a of the reinforcing area portion 30 has outer peripheral edges formed by taking an arc centered at the rotational axis P and having the same radius as the radius of the outer peripheral edge 40a of the open area portion 40 and by drawing three straight chords each ending at two of adjacent points out of four points (including the two points 33a) positioned over the arc and by removing regions between the arc and the chords. The distance D3b from the rotational axis P to the outer peripheral edge 30a of the reinforcing area portion 30 at two points 33a, 33a thereof is greater than the distance D3a described above.

Other Embodiment

In the foregoing respective embodiments, the distance from the rotational axis P to the center 33 of the reinforcing area portion 30 is set smaller than the distances from the rotational axis P to the centers 25, 43 of the closed area portion 20 and the open area portion 40. Alternatively, it is also possible to employ an alternative arrangement in which the distance from the rotational axis P to the center 33 of the reinforcing area portion 30 is equal to the distance from the rotational axis P to the center 25 of the closed area portion 20 or the distance from the rotational axis P to the center 43 of the open area portion 40, which also achieves an object of the invention.

Specific shapes of the outer peripheral edges 20a and 30a are not limited to the ones described above and illustrated in the drawings. A person skilled in the art will understand that the relationships in the distances as defined in the claims are achievable with other shapes.

There may be more than two ladder or interconnecting portions. A person skilled in the art will be able to choose appropriate locations for additional interconnecting portion(s).

The invention claimed is:

1. An intake apparatus for an internal combustion engine, the apparatus comprising:

an intake manifold (1) including a plurality of air feeding passages (3) that define feed switch openings (7) and a bore portion (8) and that are adapted to be connected to and feed air to a plurality of cylinders of an internal combustion engine when the air feeding passages (3) are connected to the internal combustion engine;

a rotary valve (10) defining an axial direction and including a plurality of valve portions (11) that are rotatable together about a rotational axis (P) and each of which is in communication with corresponding one of the air feeding passages (3) through corresponding one of the feed switch openings (7), the rotary valve (10) located in the bore portion and being supported to the intake manifold (1) to be rotatably switched between an open position wherein the plurality of valve portions (11) open the feed switch openings (7) and a closed position wherein the plurality of valve portions (11) close the feed switch openings (7), each of the valve portions (11) including a closing area portion (20) for closing the corresponding feed switch opening (7) and an open area portion (40) for opening the corresponding feed switch opening (7) wherein a first distance (D1) from a first central portion (25), with respect to a peripheral direction of the valve portions (11), of an outer peripheral edge (20a) of the closed area portion (20) to the rotational axis (P) is set smaller than a second distance (D2) from a second central portion (43), with respect to the peripheral direction, of an outer peripheral edge (40a) of the open area portion (40) to the rotational axis (P);

a sealing member (60) fitted to each of the valve portions (11), the sealing member (60) including a pair of ring portions (61), each of which engages corresponding one of opposite ends of the valve portion (11) in the axial direction and at least two interconnecting portions interconnecting the pair of ring portions (61), each of the sealing members (60) providing sealing between associated one of valve portions (11) and the bore portion (8) of the intake manifold (1), the interconnecting portions (62) being generally located along the feed switch opening (7) and radially between the valve portion (11) and the bore portion (8) when the rotary valve (10) is switched to the closed position; and a pair of recessed portions (76) defined on an outer side of each of the valve portions (11) for receiving engaging portions (64) defined on inner sides of the interconnecting portions of each of the sealing members (60).

2. The intake apparatus for an internal combustion engine, according to claim 1, wherein the outer peripheral edge (20a) of the open area portion (20) of the valve portion (11) is formed as an arc-shaped edge centered at the rotational axis (P).

3. The intake apparatus for an internal combustion engine, according to claim 2, wherein the valve portion (11) includes a reinforcing area portion (30) disposed on a side opposite from the closed area portion (20) relative to the valve rotational axis (P): and a third distance (D3a) from a third central portion (33), with respect to the peripheral direction, of an outer peripheral edge (30*a*) of the reinforcing area portion (30) to the rotational axis (P) is set smaller than the second distance (D2).

4. The intake apparatus for an internal combustion engine, according to claim 3, wherein;

when the rotary valve (10) is switched to the closed position, a sealing gap (A) between the ladder engaging portion (62) and an inner face portion (77) of the recessed portion (76) located, with respect to the ladder engaging portion (62), on the side opposite from the side where the feed switch opening (7) is present is smaller than a valve gap (B1) provided between the valve portion (11) and the bore portion (8); and the first distance (D1*a*) is set greater than the third distance (D3*a*).

5. The intake apparatus for an internal combustion engine, according to claim 1, wherein the valve portion (11) includes a reinforcing area portion (30) disposed on a side opposite from the closed area portion (20) relative to the valve rotational axis (P): and a third distance (D3*a*) from a third central portion (33), with respect to the peripheral direction, of an outer peripheral edge (30*a*) of the reinforcing area portion (30) to the rotational axis (P) is set smaller than the second distance (D2).

6. The intake apparatus for an internal combustion engine, according to claim 5, wherein;

when the rotary valve (10) is switched to the closed position, a sealing gap (A) between the ladder engaging portion (62) and an inner face portion (77) of the recessed portion (76) located, with respect to the ladder engaging portion (62), on the side opposite from the side where the feed switch opening (7) is present is smaller than a valve gap (B1) provided between the valve portion (11) and the bore portion (8); and the first distance (D1*a*) is set greater than the third distance (D3*a*).

* * * * *